United States Patent [19]

Hightower

[11] Patent Number: 5,030,189
[45] Date of Patent: Jul. 9, 1991

[54] METHOD OF MAKING ENVELOPE WITH TEAR LINE FORMED BY ULTRASONIC ENERGY

[75] Inventor: A. Derrell Hightower, Stone Mountain, Ga.

[73] Assignee: National Services Industries, Inc., Atlanta, Ga.

[21] Appl. No.: 457,934

[22] Filed: Dec. 27, 1989

[51] Int. Cl.⁵ .................. B31B 19/74; B31B 19/90
[52] U.S. Cl. .................. 493/186; 493/233; 493/267; 493/923; 493/930; 206/610; 206/807; 383/84
[58] Field of Search ............ 493/186, 211, 230, 233, 493/267, 480, 923, 930, 963; 206/610, 632, 807; 383/84, 908

[56] References Cited

U.S. PATENT DOCUMENTS

| | | |
|---|---|---|
| 3,224,916 | 12/1965 | Soloff et al. . |
| 3,294,313 | 12/1966 | Spaulding .................. 206/610 |
| 3,318,510 | 5/1967 | Quarles et al. .................. 206/610 |
| 3,321,126 | 5/1967 | Rivman et al. .................. 383/84 |
| 3,440,117 | 4/1969 | Soloff . |
| 3,440,118 | 4/1969 | Obeda . |
| 3,483,066 | 12/1969 | Harris et al. . |
| 3,635,609 | 1/1972 | Balamuth . |
| 3,650,463 | 3/1972 | Christiansen et al. .................. 206/610 |
| 3,749,620 | 7/1973 | Montgomery . |
| 3,752,620 | 8/1973 | Renoux . |
| 3,835,754 | 9/1974 | Lewyckyj .................. 493/963 |
| 3,993,532 | 11/1976 | McDonald et al. . |
| 4,032,382 | 6/1977 | Obeda . |
| 4,071,385 | 1/1978 | Kuris . |
| 4,237,181 | 12/1980 | Tanabe et al. . |
| 4,247,273 | 1/1981 | Pogrzeba et al. . |
| 4,265,842 | 5/1981 | Summo . |
| 4,304,615 | 12/1981 | Siegel .................. 493/194 |
| 4,326,903 | 4/1982 | Summo . |
| 4,389,267 | 6/1983 | Denslow . |
| 4,443,211 | 4/1984 | Wooley . |
| 4,529,473 | 7/1985 | Mims . |

OTHER PUBLICATIONS

Data Sheet PW-31 of Branson Sonic Power Company.
Data Sheet FF-2 of Branson Sonic Power Company.

Primary Examiner—William E. Terrell
Attorney, Agent, or Firm—Mason, Fenwick & Lawrence

[57] ABSTRACT

Method for forming an envelope having a tear strip or a tear-off flap portion for aiding in opening the envelope, comprising the steps of providing an envelope blank formed of a material capable of being weakened by the application of ultrasonic frequencies, forming the blank into a finished envelope, and applying ultrasonic energy to the finished envelope to form either a pair of closely-spaced, elongate distress lines or a single, straight distress line at which the fibers forming the material are weakened, thus defining a tear strip or a tear-off flap portion capable of manual separation form the remainder of the envelope. An envelope formed according to the above method comprises a body portion having a front panel, a back panel, and a seal flap extending outwardly from and formed integrally with a side of the front panel. The flap has a pair of closely-spaced, elongate distress lines or a single, elongate distress line extending transversely of the flap at which the fibers forming the material are weakened, the distress lines being formed by the application of an ultrasonic frequency and defining a tear strip or a tear-off portion capable of manual separation form the remainder of the flap. The distress lines forming the tear strip can be straight or serpentine. The distress line forming the tear-off portion is straight.

34 Claims, 3 Drawing Sheets

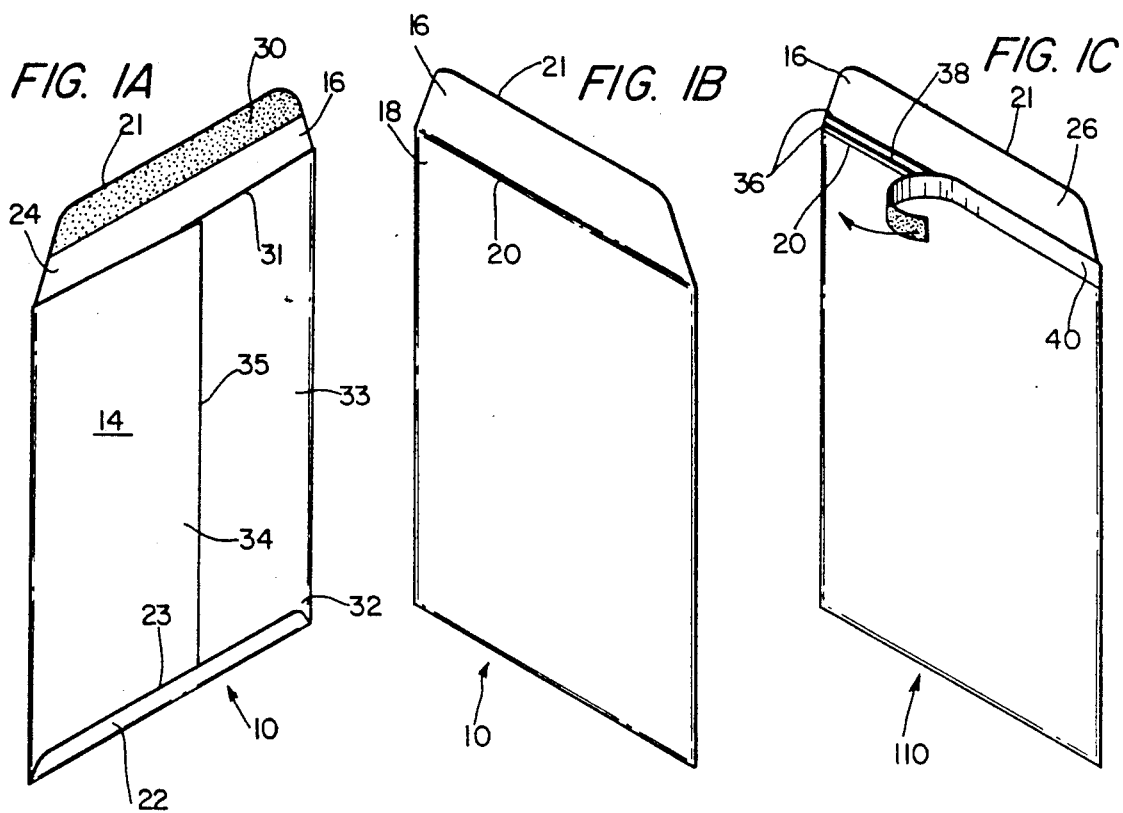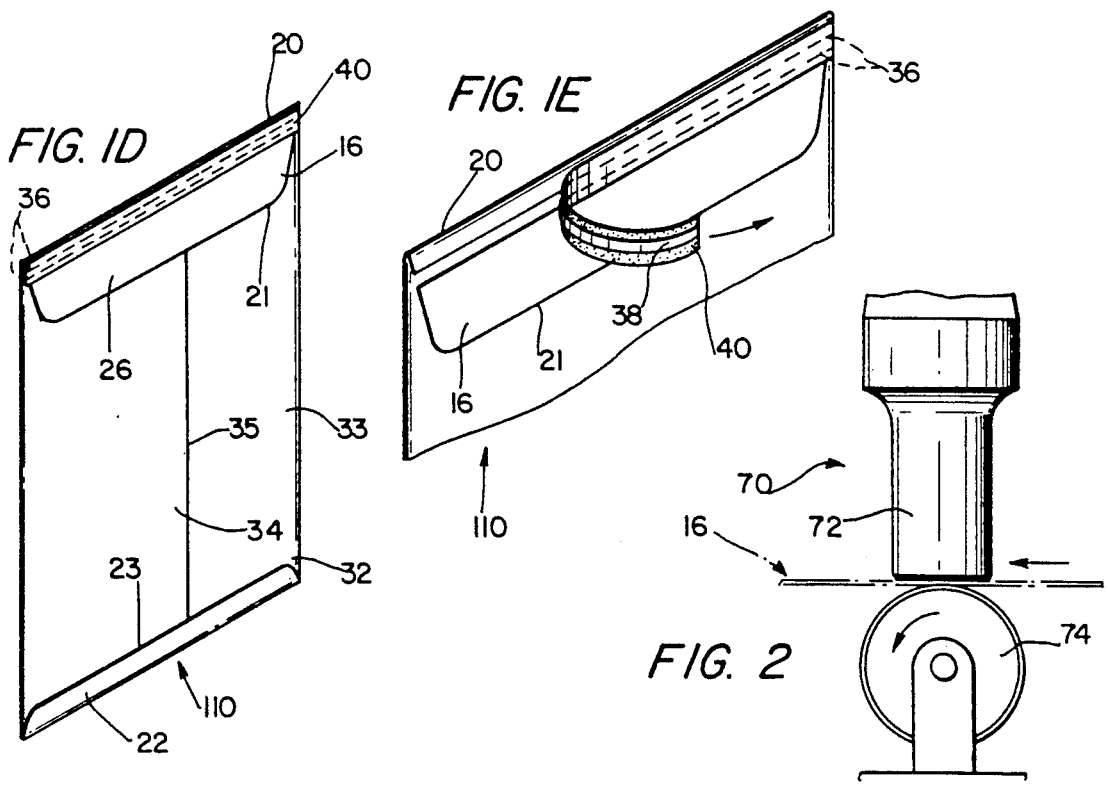

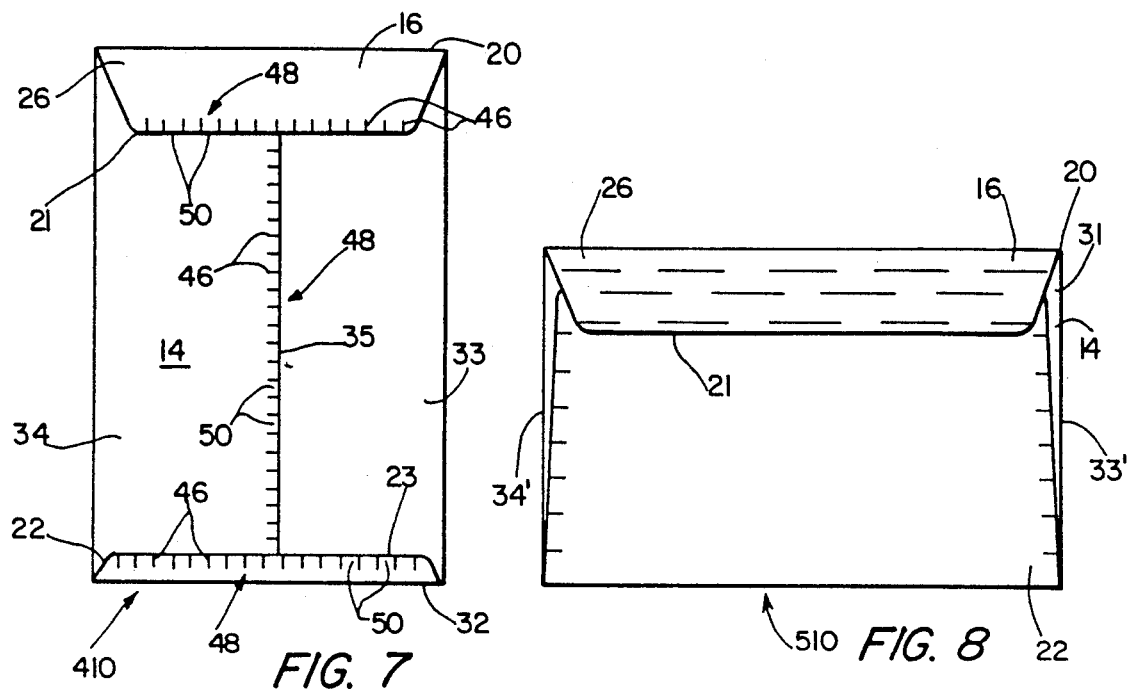
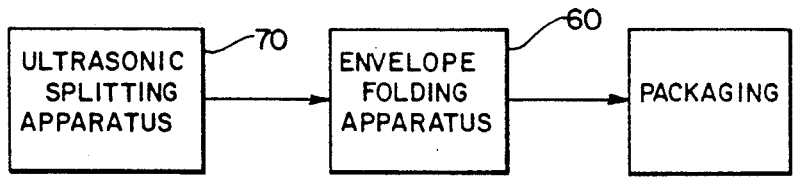
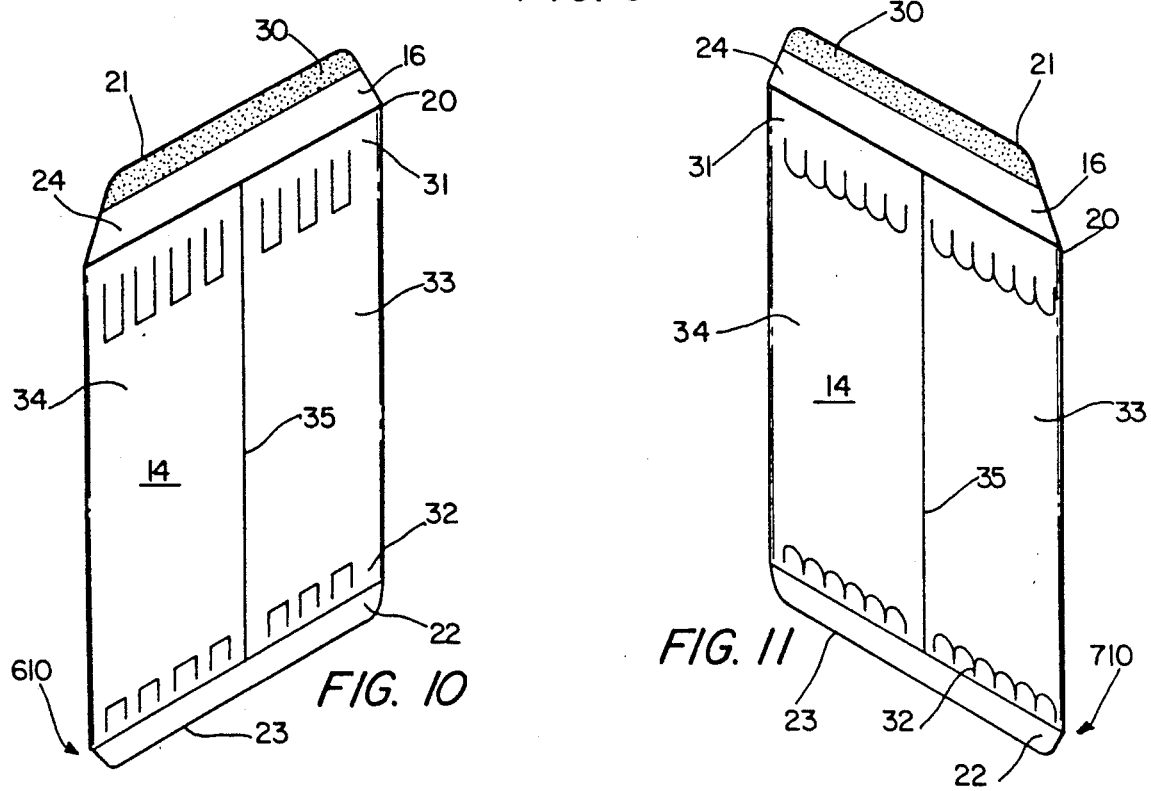

METHOD OF MAKING ENVELOPE WITH TEAR LINE FORMED BY ULTRASONIC ENERGY

BACKGROUND OF THE INVENTION

The present invention is directed to the field of envelopes, and is more specifically directed to envelopes having tear strips or tear-off flap portions or tamper-evident flap portions specifically formed therein.

It is known to make envelopes from a number of different kinds of paper stocks. In recent years, envelopes have been made from spun olefin in the form of heat and pressure high-density polyethylene fibers forming a sheet. The spun bonded olefin is sold by E.I. Du Pont under the trademark TYVEK, and envelopes formed of TYVEK have been sold by Atlantic Envelope Company under the trademark POLYWOVE. The popularity of such envelopes is due in large part to the light weight, high dimensional stability and capacity, great toughness and durability, and low absorption of water of such envelopes. However, the excellent stability, thoroughness and durability characteristics of high-density polyethylene fiber envelopes make them extremely difficult to open because they are highly resistant to tearing, and the strength of the adhesive necessary to bond the flap to the body of the envelope necessitates substantial effort to separate the flap from the body of the envelope once it has been sealed. Such are the characteristics of these envelopes that it is even difficult to open them at the fold line of the flap using a conventional letter opener. It is therefore often necessary to resort to using scissors to cut open the envelope at the top or bottom. However, in doing this, there is often considerable risk or also cutting, and therefore damaging, the contents of the envelope.

The characteristics of these envelopes which make them popular for business use also make them susceptible to undetected tampering. In an increasingly common practice, an envelope is intercepted after leaving the sender, one of the flaps is carefully opened, materials are added or removed, the envelope is resealed and replaced, and in the case of added materials, before being delivered to its destination, the envelope is intercepted, reopened, relieved of the added materials, and resealed. Because of its dimensional stability, toughness, and durability, the envelope can be opened, resealed, reopened, and again resealed at the flap without any outward signs which would alert the intended recipient. Tampering is therefore difficult, if not impossible, to detect. The substantial effort needed to open the flaps, far from being a deterrent, is in fact a kind of incentive, as it falsely leads both the sender and the intended recipient to assume that the envelope is tamper-proof.

Until the present invention, there had been no satisfactory mechanism incorporated into bonded, high-density polyethylene fiber envelopes to enable them to be easily opened or to provide evidence of tampering. I have discovered that ultrasonic energy can be applied to sheets of bonded, high-density polyethylene fibers to form distress patterns at which the fibers are weakened and to provide either a tear strip which can be pulled away from the remainder of the envelope to create an opening in the envelope. I have also discovered that ultrasonic energy can be applied to the seal flap and other closure locations of envelope blanks formed of sheets of bonded, high-density polyethylene fibers to form distress patterns or lines which will function as a tamper-evident feature. Moreover, the inventive method can also be used to create tear strips or tamper-evident strips in envelopes made from standard paper stock, and to create tear-off portions in the flaps of envelopes.

The following documents disclose apparatus for applying ultrasonic energy to plastic or thermoplastic material to emboss designs in the materials, or to fuse them together, or to form a crease in them: U.S. Pat. No. 4,529,473 to Mims; U.S. Pat. No. 4,389,267 to Denslow; U.S. Pat. Nos. 4,326,903 and 4,265,847 to Summo; U.S. Pat. No. 4,247,273 to Pogrzeba et al.; U.S. Pat. No. 4,237,181 to Tanabe et al; U.S. Pat. No. 4,071,853 to Kuris; U.S. Pat. No. 4,032,382 to Obeda; U.S. Pat. No. 3,893,532 to McDonald et al.; U.S. Pat. No. 3,752,620 to Renoux; U.S. Pat. No. 3,749,620 to Montgomery; U.S. Pat. No. 3,635,609 to Balamuth; U.S. Pat. No. 3,483,066 to Harris et al.; U.S. Pat. No. 3,440,117 to Soloff; U.S. Pat. No. 3,224,916 to Soloff et al.; and Data Sheets PW-31 and FF-2 of Branson Sonic Power Company. However none of these documents disclose or suggest the use or ultrasonic energy to form distress lines defining a tear strip or tear-off portion for use in an envelope of any kind, or the use of ultrasonic energy to form distress line areas defining a tear strip or tear-off portion or to form distress patterns defining a tamper-evident feature in bonded, high-density polyethylene fibers for use in an envelope or for any other purpose.

SUMMARY OF THE INVENTION

Therefore, it is the primary object of this invention to provide a tear strip feature in an envelope made of bonded, high-density polyethylene fibers by which the envelope can easily be opened.

It is another object of this invention is to provide a reinforced tear strip in an envelope made of bonded, high-density polyethylene fibers which is formed using ultrasonic energy.

It is still another object of this invention to provide a tear strip or perforation formed by using ultrasonic energy in an envelope made from any paper stock.

It is still another object of this invention to provide a tamper-evident feature in an envelope made of bonded, high-density polyethylene fibers by which any attempt to open the sealed flaps of the envelope ca be easily detected.

It is a further object of this invention to provide a new method for forming tear strips, tamper-evident portions, and patterns or designs in envelopes using ultrasonic energy.

The foregoing and other objects of the invention are achieved by provision of a first method for forming an envelope having a tear strip for aiding in opening the envelope, comprising the steps of providing an envelope blank formed of material capable of being weakened by application of ultrasonic frequencies, forming the blank into a finished envelope, and applying ultrasonic energy to the finished envelope, to form a pair of closely-spaced, elongate distress patterns at which the fibers forming the material are weakened to define a tear strip capable of manual separation from the remainder of the envelope. A strip of tape, e.g. pressure sensitive tape, can be applied the full length of the tear strip to reinforce the weakened material. In one aspect of the invention, the ultrasonic energy is applied in a manner to create distress patterns which are substantially parallel. In other aspects of the invention, the distress lines are substantially linear or are serpentine. In still another aspect of the invention, a single perforated distress line is used to define a tear-off portion in the flap capable of manual separation from the remainder of the flap.

An envelope made according to the first method comprises a body portion formed of a material capable of being weakened by ultrasonic energy and having a front panel, a back panel, and a seal flap extending outwardly from and formed integrally with a side of the front panel. The seal flap has a pair of closely spaced, elongated distress patterns or a single, elongate distress pattern therein extending transversely of the flap, at which the fibers forming the material are weakened. The distress patterns are formed by the application of an ultrasonic frequency. When formed in pairs, the distress patterns define a tear strip capable of manual separation from the remainder of the flap, while when used singly, the distress pattern defines a tear-off portion capable of manual separation from the remainder of the flap. The distress patterns can be reinforced by a strip of tape applied along their full length.

A second method for forming an envelope having a tamper-evident feature for indicating that a flap of the envelope has been tampered with comprises the steps of providing an envelope blank for an envelope having at least one flap, the blank being formed of material capable of being weakened by application of ultrasonic frequencies, applying ultrasonic energy to the at least one flap of the blank to .form at least one elongate distress pattern at which the fibers forming the material are weakened to define a tamper-evident portion at least a portion of which is capable of separation from the remainder of the at least one flap when an attempt is made to open the at least one flap after sealing, and forming the blank into a finished envelope. In one aspect of the invention, the ultrasonic energy is applied in a manner to create a distress pattern comprising a plurality of parallel lines. The lines can be parallel or vertical to the edge of the at least one flap. In other aspects of the invention, the distress pattern can be formed to define a pattern or design.

An envelope made according to the second method comprises a body portion formed of a material capable of being weakened by ultrasonic energy and having a front panel, a back panel, and at least one seal flap extending outwardly from and formed integrally with a side of the front panel. The seal flap has at least one elongate distress pattern therein extending transversely of the flap, at which the fibers forming the material are weakened. The distress pattern is formed by the application of an ultrasonic frequency, and can comprise a plurality of parallel lines formed either parallel or vertical to the edge of the at least one flap.

A better understanding of the disclosed embodiments of the invention will be achieved when the accompanying detailed description is considered in conjunction with the appended drawings, in which like reference numerals are used for the same parts as illustrated in the different figures.

BRIEF DESCRIPTION OF THE DRAWINGS

FIG. 1A is a back perspective view of an envelope;

FIG. 1B is a front perspective view of the envelope or FIG. 1A;

FIGS. 1C shows the envelope of FIGS. 1A and 1B incorporating a tear strip and reinforcing tape according to a first embodiment of the invention;

FIG. 1D is a back perspective view of the envelope of FIG. 1C in which the envelope has been sealed;

FIG. 1E is a partial, enlarged view of the envelope of FIG. 1D showing the tear strip and reinforcing tape being removed;

FIG. 2 is a side elevational view of a portion of the apparatus for carrying out the methods of the invention;

FIG. 7 is a back elevational view of the envelope of FIGS. 1A and 1B having a tamper-evident feature according to a fifth embodiment of the invention;

FIG. 8 is a back elevational view of an envelope having a tamper-evident feature according to a sixth embodiment of the invention;

FIG. 9 is a block diagram illustrating the steps of a second method of the invention;

FIG. 10 is a back perspective view of the envelope of FIGS. 1A and 1B having a tamper-evident feature according to a seventh embodiment of the invention; and FIG. 11 is a back perspective view of the envelope of FIGS. 1A and 1B having a tamper-evident feature according to an eighth embodiment of the invention.

DESCRIPTION OF THE PREFERRED EMBODIMENT

Figure 3:
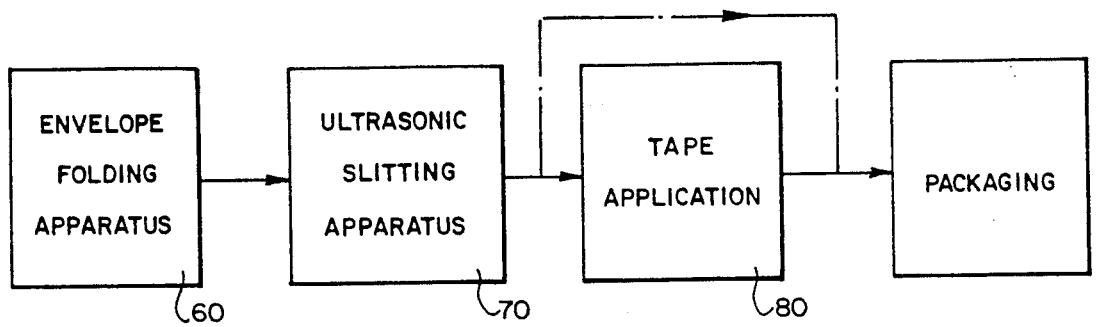
FIG. 3 is a block diagram illustrating the steps of a first method of the invention.

Referring now to FIGS. 1A and 1B, there is shown an envelope 10 of standard construction comprising a front panel 12, a back panel 14, a seal flap 16 extending from the top edge 18 of front panel 12 at a fold line 20 and having a free edge 21, and a bottom flap 22 extending from the bottom edge 19 of front panel 12 and having a free edge 23. Seal flap 16 has an inside surface 24 and an outside surface 26, and is provided on its inside surface 24 adjacent its free edge 21 with a strip of adhesive 30 for sealing seal flap 16 to back panel 14. Back panel 14 also is provided with top and bottom edges 31 and 32 and with inner and outer center seam flaps 33 and 34. The free edge 35 of outer center seam flap 34 overlaps the free edge (not shown) of inner center seam flap 33.

Adhesive 30 can be either the pressure-sensitive type requiring a protective strip (not shown) to cover the adhesive until the envelope is ready to be sealed, or it can be of the dry type, requiring moistening to activate the adhesive Envelope 10 can be made of bonded, high-density polyethylene fibers or it can be made of any standard paper stock used for envelopes.

Referring now to FIG. 3, in order to provide envelope 10 with distress lines forming a tear strip according to the invention, an in-line ultrasonic device 70 is provided to conventional envelope-folding apparatus 60 at the discharge or delivery end of the envelope folding apparatus. One type of envelope-folding apparatus suitable for use in forming an envelope 10 according to the method of the invention is the BOE envelope-folding machine manufactured by F.L. Smythe Machinery Co. Another apparatus is described in U.S. Pat. No. 4,443,211 to Wooley. The ultrasonic device 70 is provided at the location labeled "SCORE & FOLD BOT- TOM FLAP" in the Wooley patent. A blank for forming envelope 10 is placed into the apparatus at the feeding end, the folded envelope 10 being produced at the discharge end and then being conveyed to the in-line ultrasonic device.

The in-line ultrasonic device 70 comprises a conventional ultrasonic slitter, such as the Branson model F-10 slitter manufactured by Branson Sonic Power Company, of Danbury Conn., fitted with an ultrasonic stitching wheel of the desired pattern, described respectively in Branson Data Sheets PW-31 and FF-2. As shown in FIG. 2, seal flap 16 (or any other desired part) of envelope 10 is passed widthwise (i.e. parallel to fold line 20) between horn 72 of the ultrasonic slitter and stitching wheel 74, and exposed to an ultrasonic frequency of approximately 20kHz, forming weakened areas or distress lines in seal flap 16 between adhesive 30 and fold line 20 extending across the entire width of seal flap 16. A frequency of approximately 20kHz provides a distress line in a single sheet of bonded, high-density polyethylene fiber material that can be easily separated manually along the edges of the distress line but that will not otherwise separate under normal handling conditions.

I have found several patterns which provide desirable results, i.e. a tear strip which can be readily separated form the remainder of seal flap 16. A first pattern, shown in FIGS. 1C-1E comprises a pair of closely-spaced parallel, continuous, straight distress lines 36 at which the fibers forming the paper are weakened. Distress lines 36 thus form or define a tear strip 38 which can be manually separated from the remainder of seal flap 16. Each distress line 36 is of substantially identical thickness, preferably 1/32 inch to 1/16 inch, and distress lines 36 are separated by a distance several times wider than their thickness, preferably ⅛ inch to ½ inch. Such distress lines 36 can be made using a Branson EDP No. 101-160-998 stitching wheel.

Because they are straight and continuous, distress lines 36 decrease the rigidity of seal flap 16, causing seal flap 16 to tend to fold along distress lines 36. I have therefore found it desirable to provide a reinforcement tape 40 over distress lines 36 on outside surface 26 of seal flap 16, as shown in FIG. 1C. This is accomplished by conveying envelope 10 with distress lines 36 formed therein to a conventional tape dispenser/applicator 80, as shown in FIG. 3. The tape dispenser/applicator 80 dispenses tape 40 and applies it to seal flap 16 as required. Tape 40 preferably is pressuresensitive tape, although other tapes are suitable. After tape 40 is applied, the finished envelope is returned to the folder operator for final packaging.

Once finished envelope 110 is sealed (FIG. 1D), tear strip 38 and tape 40 can be pulled away together from seal flap 16 to open envelope 110 (FIG. 1E).

Figure 4:
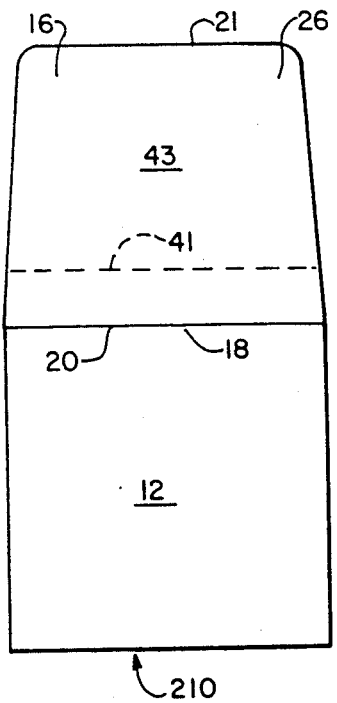
FIG. 4 is a front elevational view of an envelope having a tear-off flap according to a second embodiment of the invention.
Figure 5:
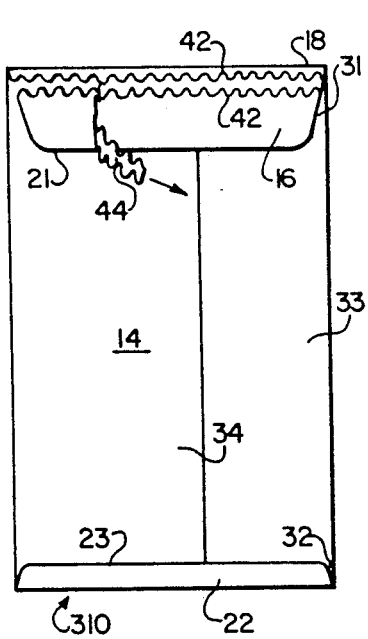
FIG. 5 is a back elevational view of the envelope of FIGS. 1A and 1B having a tear strip according to a third embodiment of the invention, in which the envelope has been sealed and the tear strip is being removed.

A second pattern, shown in FIG. 4A, comprises a single perforated distress line 41 parallel to fold line 20 forming a tear-off portion 43, which could serve as a response coupon, receipt, or other applications for an envelope flap. It will be understood that other patterns, such as a serpentine or zig-zag pattern, can also be used singly to form a tear-off portion.

To make a finished envelope 210 employing a perforated distress line 41, a blank for forming an envelope 10 is placed in the envelope-forming apparatus, from which folded envelope 10 is conveyed to the ultrasonic apparatus previously described. However, perforated distress line 41 does not have a substantial adverse affect on the rigidity of seal flap 16, so reinforcement (e.g. using tape) is not as critical, and the finished envelope 210 can be conveyed directly to the folder operator for final packaging as shown by the dashed lines in FIG. 3.

A third pattern, shown in FIG. 4B, comprises a pair of closely-spaced, continuous, serpentine distress patterns 42 forming a tear strip 44. Distress patterns 42 preferably are parallel, i.e. the troughs and crests of one distress pattern 42 are aligned with the troughs and crests, respectively, of the other distress pattern 42. The thickness of serpentine distress patterns 42 and the distance between them preferably are the same as for straight distress lines 36.

Because they are serpentine, distress patterns 42 preserve the rigidity of seal flap 16, and in this respect are superior to straight distress lines 36. However, serpentine distress patterns 42 are not as effective as straight distress lines 36 for tearing through all the fibers of an envelope made from bonded, high-density polyethylene fibers.

To make a finished envelope 310 employing a serpentine tear strip 44, a blank for forming an envelope 10 is placed in the envelope-forming apparatus, from which folded envelope 10 is conveyed to the ultrasonic apparatus as previously described However, like distress line 41, serpentine distress patterns 42 do not have any substantial adverse effect on the rigidity or seal flap 16, so the finished envelope 310 can be conveyed directly to the folder operator for final packaging, as shown by the dashed lines in FIG. 3, without addition or reinforcement tape.

Other patterns for forming a tear strip can be used, for example a pair of closely-spaced parallel, zig-zag patterns or other continuous (unbroken) designs, or a pair of closely-spaced, non-parallel zig-zag or serpentine patterns (by non-parallel is meant that the troughs and crests of one distress pattern are aligned with the crests and troughs, respectively, of the other distress pattern). Likewise, other patterns for forming a tear-off portion can be used. However, it has been found that the patterns shown in FIGS. 1C-1E, 4, and 5 are preferable in terms of permitting easy tearing through all the fibers of an envelope made from bonded high-density polyethylene fibers.

It should also be understood that a tear strip according to the invention can be provided in the bottom flap 22 of envelope 10 in the same manner as in seal flap 16. A tear strip according to the invention can also be provided across the full width of either or both of front panel 12 or back panel 14. However, in the case where the tear strip is provided in front panel 12 or back panel 14, the distress lines would be formed in the envelope blank prior to placement of the blank in the envelope folding apparatus, as shown in FIG. 9.

Referring now to FIG. 9, in order to provide envelope 10 with a distress pattern forming a tamper-evident feature according to the invention, an in-line ultrasonic device 70 is provided to envelope-folding apparatus 60 at the feeding end of envelope-folding apparatus 60. As shown in FIG. 2, seal flaps 16 and 22 are passed widthwise between the horn 72 of the ultrasonic slitter and stitching wheel 74, and exposed to an ultrasonic frequency of approximately 20 khz to form distress patterns. Outer center seam flap 34 can also be passed lengthwise (i.e. parallel its free edge 35) between horn 72 and etching wheel 74. Alternatively, top and bottom edges 31 and 32 of back panel 14 and inner center seam flap 33 can be passed between horn 72 and stitching wheel 74. The ultrasonically-distressed blank is then placed into the envelope-forming apparatus at the feeding end and folded normally to form a completed envelope 10.

I have found several patterns which provide a desirable tamper-evident feature, i.e. one in which at least a portion of the pattern separates from the adjoining portions of the envelope at a point where the envelope is opened. A first pattern, shown in FIG. 7, comprises a plurality of closely-spaced parallel, distress lines 46 formed adjacent and perpendicular to free edges 21, 23, and 35 of flaps 16, 22, and 34, respectively, at which the fibers forming the paper are weakened. Distress lines 46 formed in flaps 16 and 22 are positioned in registration with the area where the adhesive is provided for sealing flaps 16 and 22, while distress line 46 formed in flap 34 is positioned in registration with the area where a strip of adhesive (not shown) is provided for sealing flap 34 over flap 33. The manual force necessary to rupture distress lines 46 is substantially less than the manual force necessary to open flaps 16, 22, and 34 once they are sealed. Distress lines 46 thus define tamper-evident strips 48 comprising a plurality of adjacent tabs 50 which will separate from each other if the flap 16, 22, or 34 on which they are formed is opened.

Each distress line 46 is of substantially identical thickness, preferably 1/32 inch to 1/16 inch, and adjacent distress lines 46 are separated from each other by a distance several times wider than their thickness. After the blank for forming the envelope is passed through ultrasonic slitting apparatus 70 to form distress lines 46, the blank is conveyed to envelope-folding apparatus 60 and further processed to obtain a folded envelope 410.

A second pattern is shown in FIG. 8 with respect to a finished envelope 510 having an enlarged bottom flap 22 and a pair of side seam flaps 33' and 34'. This pattern comprises a plurality of closely-spaced parallel, perforated, straight distress lines 51 formed adjacent and parallel to free edge 21 of flap 16 and a plurality of closely-spaced parallel, straight distress lines 46 formed adjacent and perpendicular to side edges 52 of bottom flap 22, at which the fibers forming the paper are weakened. Distress lines 46 formed in flap 22 are positioned in registration with the area where strips of adhesive (not shown) for sealing flap 22 over flaps 33' and 34' is provided, while distress lines 51 formed in flap 34 are positioned in registration with the area where strip of adhesive 30 is provided. Distress lines 46 thus define tamper-evident strips 48 comprising a plurality of adjacent rectangular tabs 50 which will separate from each other if flap 22 on which they are formed is opened, while distress lines 51 define a tamper-evident strip 53 at least a portion of which will separate from the remaining portions of flap 16 on which it is formed is opened. After the blank for forming the envelope is passed through ultrasonic slitting apparatus 70 to form distress lines 46 and 51, the blank is conveyed to envelope-folding apparatus 60 and further processed to obtain a folded envelope 510.

A third pattern, shown in FIG. 10, comprises a plurality of closely-spaced parallel, inwardly-extending rectangular tabs 54 formed adjacent to free edges 21 and 23 of flaps 16 and 22, respectively, at which the fibers forming the paper are weakened. Tabs 54 are positioned to at least partially register with the areas where adhesive is provided to sea flaps 16 and 22. Thus, tabs 54 will separate from center sea flaps 33 and 34 in which they are formed if the flap 16 or 22 which is sealed over them is opened. After the blank of forming the envelope is passed through ultrasonic slitting apparatus 70 to form tabs 54, the blank is conveyed to envelope-folding apparatus 60 and further processed to obtain folded envelope 610.

A fourth pattern, shown in FIG. 11, comprises an elongated, inwardly-extending, scalloped pattern 56 formed adjacent to free edges 21 and 23 of flaps 16 and 22 respectively, at which the fibers forming the paper are weakened. Scalloped pattern 56 is positioned to at least partially register with the areas where adhesive is provided to seal flaps 16 and 22. Distress patterns 56 thus define tamper-evident strips 57 comprising a plurality of adjacent, rounded tabs 58 which will separate from each other and from center seam flaps 33 and 34 in which they are formed if the flap 16 or 22 which is sealed over them is opened. After the blank for forming the envelope is passed through ultrasonic slitting apparatus 70 to form distress patterns 56, the blank is conveyed to envelope-folding apparatus 60 and further processed to obtain a folded envelope 710.

Figure 6:
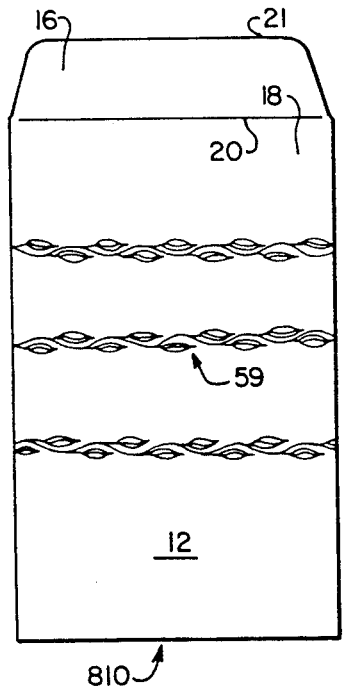
FIG. 6 is a front elevational view of the envelope of FIGS. 1A and 1B incorporating a design according to a fourth embodiment of the invention.

It is also possible to use ultrasonic slitting apparatus 70 to provide a decorative, embossed pattern 59 on the envelope, as shown in FIG. 6, extending across all or a portion or front and back panels 12 and 14. In this case, in-line ultrasonic slitting apparatus 70 is provided at the blank feeder end of the envelope folding apparatus, and the blank for forming the folded envelope 410 is passed widthwise, lengthwise, diagonally, or in any other desired direction between horn 32 and stitching wheel 34 as many times as necessary to form the desired pattern. The embossed blank is then conveyed to envelope-folding apparatus 60 and further processed as necessary to obtain a folded envelope 810. For example, folded envelope 810 could be provided with a tear strip 38 or 44 or a tear-off flap 43 as described above.

Thus it will be seen that the present invention provides a unique method for providing a tear strip, tear-off flap, tamper-evident strip, tamper-evident flap, or decorative patterns in envelopes, and that a tear strip, tear-off flap, tamper-evident strip, or tamper-evident flap according to the invention is both effective and easy to use. While the preferred embodiments of the invention have been disclosed, it should be understood that the spirit and scope of the invention are to be limited solely by the appended claims, since numerous modifications of the disclosed embodiments will undoubtedly occur to those of skill in the art.

I claim:

1. A method for forming an envelope having a tear-away portion for aiding in opening the envelope, comprising the steps of:
    (a) providing an envelope blank formed of fibrous material capable of being weakened by the application of ultrasonic frequencies;
    (b) following said step (a), forming the blank into a finished envelope; and
    (c) following said step (b), applying ultrasonic energy to the finished envelope to form at least one elongate distress pattern weakening the fibers forming the material to define a tear-away portion capable of manual separation from the remainder of the envelope.

2. The method of claim 1, wherein step (c) comprises applying ultrasonic energy to the finished envelope to form a pair of closely-spaced, elongate distress patterns at which the fibers forming the material are weakened to define a tear strip capable of manual separation from the remainder of the envelope.

3. The method of claim 1, wherein the step (a), the blank is formed of bonded, high-density polyethylene fibers.

4. The method of claim 1, wherein in step (c), the ultrasonic energy is applied at a frequency of approximately 20 kHz.

5. The method of claim 1, wherein in step (c), the distress patterns are serpentine.

6. The method of claim 1, wherein in step (b), the finished envelope includes a flap and wherein in step (c), the distress patterns are formed in the flap.

7. The method of claim 2, wherein in step (c) the distress patterns are substantially parallel.

8. The method of claim 7, wherein in step (c), the distress patterns are formed as substantially straight lines.

9. The method of claim 8, further comprising the step of:
(d) applying a reinforcement strip over the distress lines.

10. The method of claim 7, wherein in step (c), the distress patterns are serpentine.

11. The method of claim 3, wherein in step (c), the ultrasonic energy is applied at a frequency of approximately 20 kHz.

12. The method of claim 3, wherein in step (c), the distress patterns are substantially parallel.

13. The method of claim 3, wherein in step (c), the distress patterns are formed as substantially straight lines.

14. The method of claim 13, further comprising the step of:
(d) applying a reinforcement strip over the distress lines.

15. The method of claim 3, wherein in step (c) the distress patterns are serpentine.

16. The method of claim 12, wherein in step (c) the distress patterns are serpentine.

17. The method of claim 3, wherein in step (b), the finished envelope includes a flap and wherein in step (c), the distress patterns are formed in the flap.

18. The method of claim 1, wherein step (c) comprises applying ultrasonic energy to the sealing flap to form a single, elongate distress pattern at which the fibers forming the material are weakened to define a tear-off portion capable of manual separation from the remainder of the flap.

19. The method of claim 18, wherein in step (a), the blank is formed of bonded, high-density polyethylene fibers.

20. The method of claim 18, wherein in step (c), the ultrasonic energy is applied at a frequency of approximately 20 kHz.

21. The method of claim 18, wherein in step (c), the distress pattern is formed as a substantially straight, perforated line.

22. A method for forming an envelope having a tamper-evident portion for indicating that the envelope has been tampered with, comprising the steps of:
(a) providing an envelope blank formed of fibrous material capable of being weakened by the application of ultrasonic frequencies;
(b) following said step (a), applying ultrasonic energy to the envelope blank to form at least one elongate distress pattern weakening the fibers forming the material to define a tamper-evident portion capable of separation from the remainder of the envelope when an attempt is made to open the envelope in the vicinity of the tamper-evident portion; and
(c) following said step (b), forming the blank into a finished envelope.

23. The method of claim 22, wherein in step (a), the blank is formed of bonded, high-density polyethylene fibers.

24. The method of claim 22, wherein in step (b), the ultrasonic energy is applied at a frequency of approximately 20 kHz.

25. The method of claim 22, wherein in step (b), the at least one distress pattern comprises a plurality of parallel lines.

26. The method of claim 22, wherein in step (a) the envelope blank has at least one flap corresponding to a flap of the finished envelope, and wherein in step (b), a distress pattern is formed in said at least one flap.

27. The method of claim 26, wherein in step (b), the at least one distress pattern is formed as a plurality of parallel lines parallel to the edge of the at least one flap.

28. The method of claim 26, wherein in step (b), the at least one distress pattern is formed as a plurality of parallel lines perpendicular to the edge of the at least one flap.

29. The method of claim 23, wherein in step (b), the ultrasonic energy is applied at a frequency of approximately 20 kHz.

30. The method of claim 22, wherein in step (a) the envelope blank has a sealing flap and a bottom flap corresponding to the sealing flap and the bottom flap in the finished envelope, and wherein in step (b), a distress pattern is formed in both of the flaps.

31. The method of claim 30, wherein in step (b), the distress pattern in both of the flaps is formed as a plurality of parallel lines parallel to the edges of the flaps.

32. The method of claim 30, wherein in step (b), the distress pattern in both of the flaps is formed as a plurality of parallel lines perpendicular to the edges of the flaps.

33. The method of claim 30, wherein in step (a), the envelope blank is for an envelope which further has inner and outer center seam flaps corresponding to the inner and outer center seam flaps of the finished envelope, and wherein in step (b), a distress pattern is also formed in the outer center seam flap.

34. The method of claim 33, wherein in step (b), the distress pattern in the outer center seam flap comprises a plurality of parallel lines perpendicular to the edge of the outer center seam flap.

* * * * *